United States Patent

Oberst et al.

[15] 3,640,830
[45] Feb. 8, 1972

[54] VIBRATION DAMPED SANDWICH SYSTEMS HAVING INTERLAYERS OF VINYL ACETATE-ETHYLENE-ETHYLACRYLATE COPOLYMERS

[72] Inventors: Hermann Oberst; Leonhard Reihs, both of Hofheim/Taunus; Joachim Ebigt, Mainz; Gunther Duve, Frankfurt/Main; Alfred Schommer, Bad Soden/Taunus, all of Germany

[73] Assignee: Farbwerke Hoeschst Aktiengesellschaft vormals Meister Lucius & Bruning, Frankfurt/Main, Germany

[22] Filed: Oct. 19, 1970

[21] Appl. No.: 82,111

Related U.S. Application Data

[63] Continuation-in-part of Ser. No. 630,964, Apr. 14, 1967, abandoned.

[30] Foreign Application Priority Data

Apr. 23, 9166 Germany..................F 49 030

[52] U.S. Cl...........................161/165, 161/218, 181/33 G, 181/33 GA, 248/21, 260/41 A, 260/80.81, 260/80.8
[51] Int. Cl..................B32b 15/08, C08f 15/20, E04b 1/86
[58] Field of Search.....................161/165, 218; 117/132 C; 181/33 G, 33 GA; 248/21; 260/80.8, 80.81, 878, 885

[56] References Cited

UNITED STATES PATENTS

| | | | |
|---|---|---|---|
| 2,548,186 | 4/1951 | Wolf et al. | 260/80.81 |
| 3,201,324 | 8/1965 | Simms | 260/80.8 |
| 3,232,895 | 2/1966 | Klein et al. | 260/80.8 |
| 3,256,228 | 6/1966 | Tyran | 117/132 |
| 3,271,188 | 9/1966 | Albert et al. | 161/218 |
| 3,386,978 | 6/1968 | Salyer | 260/80.81 |
| 3,399,103 | 8/1968 | Salyer et al. | 161/218 |

OTHER APPLICATIONS

"Vibration-Damping Plastics and Noise Suppression"; Oberst et al.; Kunststoffe Vol. 51; 9/1961; pp. 495-502
"Sandwich Systems with optimally Designed Vibration-damping Plastic Cones"; Oberst et al. Kunststoffe; Vol. 55 8/65; pp 634-640

Primary Examiner—John T. Goolkasian
Assistant Examiner—George W. Moxon, II
Attorney—Curtis, Morris & Safford

[57] ABSTRACT

Vibration damped sandwich systems having an improved damping effect within a broad range of temperature and consisting of hard plates and a vibration damping interlayer, said interlayer comprising a copolymer of ethylene, vinyl acetate, ethyl-acrylate and acrylic and/or methacrylic acid.

3 Claims, 4 Drawing Figures

INVENTORS
HERMANN OBERST
LEONHARD REIHS
JOACHIM EBIGT
GÜNTHER DUVE
ALFRED SCHOMMER

BY *Curtis, Morris & Safford*

ATTORNEYS

VIBRATION DAMPED SANDWICH SYSTEMS HAVING INTERLAYERS OF VINYL ACETATE-ETHYLENE-ETHYLACRYLATE COPOLYMERS

This is a continuation-in-part of copending application Ser. No. 630,964, filed Apr. 14, 1967 and now abandoned.

The present invention provides vibration damped sandwich systems having interlayers made of vinyl acetate-ethylene-ethylacrylate copolymers.

It is known from South African Pat. No. 5,269 that highly valuable vibration damping materials of a broad temperature band suitable for damping bending vibrations of metal sheet constructions can be prepared by a copolymerization of monomers whose homopolymers differ in their second order transition temperature by at least 20° C. This patent also indicates that as vibration damping materials having a broad temperature band there are used, among others, predominantly amorphous copolymers of ethylene and vinyl esters of fatty acids containing two or three carbon atoms, for example vinyl acetate-ethylene copolymers. The vinyl acetate-ethylene copolymers hitherto used, however, have not been able to meet all technical requirements.

It has now been found that sandwich systems of hard plates, in particular metal sheets, having a considerably improved damping effect within a very large temperature range can be obtained by using as a vibration damping self-adhesive interlayer a copolymer of 75 to 50 percent by weight of vinyl acetate, 5 to 15 percent by weight of ethylene, 20 to 35 percent by weight of ethylacrylate and 0 to 5 percent by weight of acrylic and/or methacrylic acid. The incorporation of a third component still improves the damping properties of vinyl acetate-ethylene copolymers predominantly containing vinyl acetate, and these modified vinyl acetate-ethylene copolymers in which the damping effect depends critically on the weight proportion of the monomers, show straight and extremely broad damping curves having very high maximum values of damping within determined temperature ranges. Moreover, these copolymers may offer the advantage of reducing the costs of a vibration damping material.

Thus it has, for example, been found that vinyl acetate-ethylene copolymers modified with 20 to 30 percent by weight of ethylacrylate exhibit a very high damping efficiency within the range of normal and moderately elevated temperatures. The additional incorporation of up to 5 percent by weight of acrylic and/or methacrylic acid still improves the adhesion of the terpolymers to be used according to the invention.

The following example sets forth a satisfactory procedure for preparing copolymers of vinyl acetate, ethylacrylate and ethylene. Other known polymerization techniques can also be used to prepare the polymers.

EXAMPLE I

A mixture of 1200 g. of tert. butanol and 50 g. of water was placed into a heatable, 5-liter, refined-steel, high-pressure autoclave. The pH value of the mixture was adjusted to 4.0 with aqueous hydrochloric acid. The mixture was then heated to 60° C. and an ethylene pressure of 40 atm. was established. A solution of 6.0 g. of azodiisobutyronitrile in a mixture of 300 g. of ethylacrylate, 700 g. of vinyl acetate and 2.5 g. of acrylic acid was added over a period of 3 hours. Reaction temperature and ethylene pressure were kept constant. Subsequently, the reaction was completed under the same conditions for 3 hours. The mixture was then cooled and relieved from pressure. Copolymer was isolated from the reaction mixture by removing solvent and residual monomers under reduced pressure. The resulting copolymer contained about 15 percent of ethylene, 25 percent of ethylacrylate, 58 percent of vinyl acetate and 2 percent of acrylic acid. The molecular weight was about 1,000,000.

In the accompanying drawing, FIGS. 1a and 1b are plots showing the loss modulus $d_{comb}$ as a function of temperature.

Figure 1A:
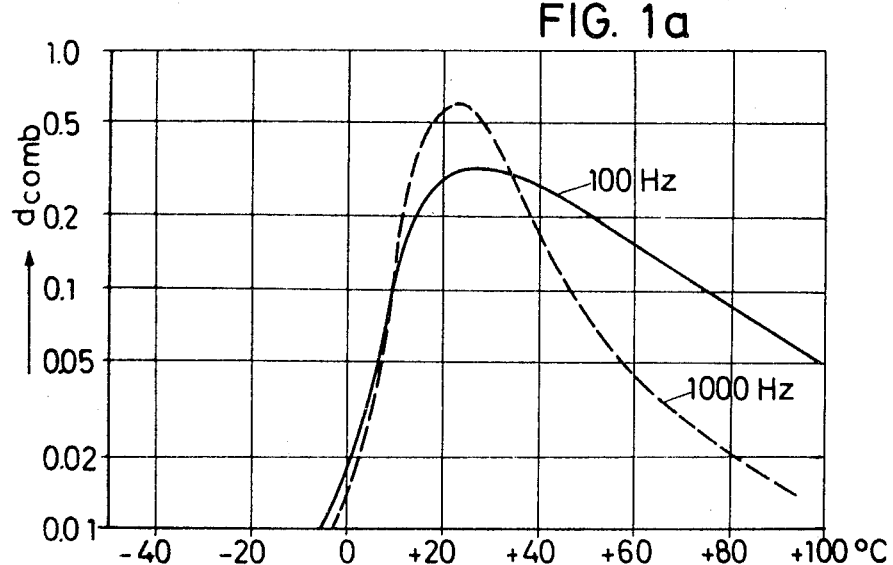
Figure 1B:
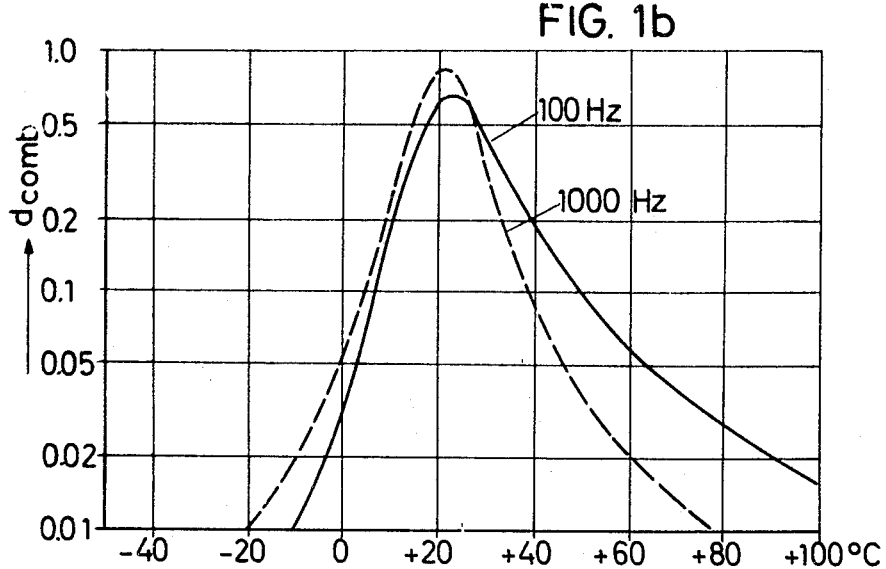
Figure 2A:
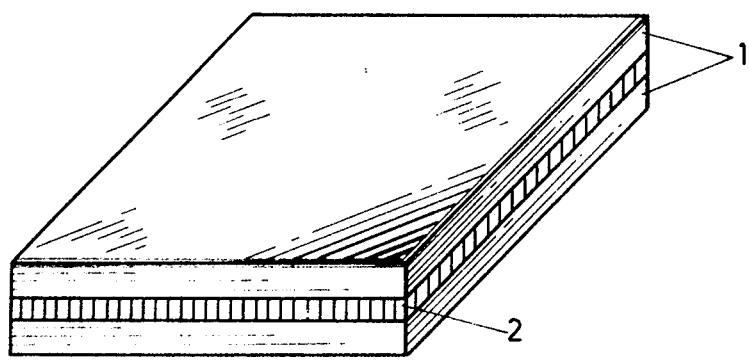
FIG. 2a shows a sandwich system of the invention in a symmetrical arrangement.
Figure 2B:
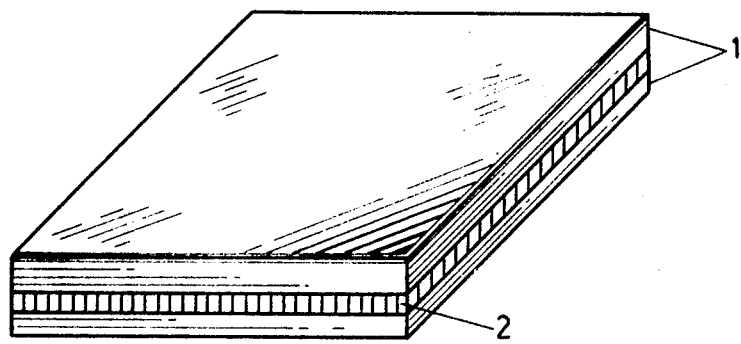
FIG. 2b shows a sandwich system in an asymmetric arrangement. The two outer plates or sheets (1) have the vibration damping layer (2) therebetween.

A comparison of FIGS. 1a and 1b illustrates the superior efficiency of the novel systems. The curve in FIG. 1a shows the loss factor $d_{comb}$ of a metal sheet arrangement of the invention as a function of temperature. It is, for example, compared with one of the most effective vibration damping materials known for metal sheet arrangements, namely a modified vinyl acetate copolymer containing plasticizers (curve in FIG. 1b). The copolymer shown in the curve of FIG. 1b is a thermoplastic adhesive especially suitable for preparing vibration damped metal sheet arrangements comprising two outer metal sheets and a self-adhesive thermoplastic as the vibration damping interlayer. Systems of this type provide a damping effect which is extremely high in its maximum and can not be exceeded for physical reasons (cf. H. Oberst and A. Schommer, Kunststoffe 55, 634 (1965), especially FIG. 9). In a symmetrical arrangement comprising two metal sheets, each of a thickness of 0.5 millimeter, and an interlayer of a thickness of 0.3 millimeter, the loss factor $d_{comb}$ of the combined system, measured in the bending resonance method (cf. for example H. Oberst, L. Bohn and F. Linhardt, Kunststoffe 51, 495 (1961), almost reaches the value $d_{comb}$ of 1. The known metal sheet constructions damped by one-sided damping coatings which are applied as layers of so-called vibration damping materials capable of being sprayed, trowelled or bonded, show loss factors generally less than $d_{comb}=0.2$, the combined system having a technically reasonable thickness of the coating or ratio of coating mass to plate mass. By means of the metal sheet sandwich systems which gain a growing importance in recent times, it is possible to obtain damping values increased by a multiple, when the interlayer material is chosen in the most appropriate composition and thickness, as is shown in the example cited herein.

The temperature bandwidth of the damping in the metal sheet sandwich system does not only depend on the viscoelastic values of the interlayer and of the steel sheets, but, to a considerable extent, also on the "geometry" of the arrangement, i.e., on the ratio of the layer thicknesses (see cited literature (1965) FIGS. 8 to 10). In the case of metal sheet sandwich systems, it is advantageous to define the bandwidth to be the range of the temperature interval within which the value $d_{comb}=0.05$ is exceeded. The damping effect of metal sheets which are not damped by additional vibration damping means in metal sheet constructions of a different kind, corresponds to values $d_{comb}=0.01$ and less. The reference value $d_{comb}=0.05$ thus means a considerable increase in the damping effect (by about 15 db. (decibel)) as compared to the "nil damping" $d_{comb}=0.01$.

In the curve shown in FIG. 1b, the reference value $d_{comb}=0.05$ is exceeded in the mainly interesting frequency range of from 100 to 1,000 c.p.s. (Hz.) at temperatures ranging from about 0° to 50° C., the temperature bandwidth therefore amounts to about 50° C. It is for this reason that sandwich systems of this type are suitable for many technical fields of application. By modifying the content of plasticizers, it is possible to shift the temperature bank of a high damping effect to higher temperatures and thus to adapt it to special technical uses, for example in machine units operating at elevated temperatures. This construction mode of metal sheet sandwich systems comprising a self-adhesive interlayer of the most appropriate composition and thickness, of a vibration damping material having a broad temperature band and being prepared by copolymerization of appropriate monomeric components, has hitherto not been excelled by other arrangements of a similar kind and can therefore be regarded as a standard system which can serve for judging the acoustic efficiency of the system of the invention by comparison.

FIGS. 1a and 1b show the temperature curves of the loss factor $d_{comb}$ of metal sheet sandwich systems comprising steel sheets of a thickness of 0.5 millimeter each and damping interlayers of a thickness of 0.3 millimeter within a frequency range of from 100 to 1,000 c.p.s. The curves have been measured in sandwich systems comprising 1a. a copolymer of 63 percent by weight of vinyl acetate, 10 percent by weight of ethylene and 27 percent by weight of ethylacrylate as an interlayer (according to the present invention) and 1b. a modified vinyl acetate copolymer containing plasticizers, as an interlayer.

The arrangement 1a) of the invention, whose monomer proportion lies in the optimal range, shows straight curves of the loss factor $d_{comb}$ in function of temperature, and a surprisingly broad temperature band with very high maximum values of damping which correspond, to a certain extent, to those of arrangement 1b). The damping center lies at a temperature ranging from 20° to 30° C., with maximum values in the range of from about 0.4 to 0.6. The temperature bandwidth is 95° C. (for 100 c.p.s. (Hz.) and 50° C. (for 1000 c.p.s. Especially favorable in the curve of FIG. 1a) is the slow decrease of the damping effect after high temperatures at 100 c.p.s. The interlayer material of arrangement 1a) is superior, at temperatures in the range of from 60° to 100° C., to that of arrangement 1b), especially by its higher damping effect at a frequency of 100 c.p.s., and it is particularly suitable for use in engine and motor casings or, for example, in washing machines operating at room temperature and at elevated temperatures.

A particular advantage of this vibration damping material resides in the fact that it is perfectly suitable for being applied continuously in the mass production of sandwich metal sheets. It also is a thermoplastic adhesive which can be applied to the metal sheets by trowelling, brushing or pouring at elevated temperatures. The sandwich system is then advantageously cooled under pressure between rolls. Except for degreasing the metal sheets do neither require a preliminary treatment nor another bond. Copolymers containing acrylic or methacrylic acid groups may even do without degreasing. An excellent adhesion is achieved.

The vibration damping material has a good resistance to flow which may still be improved in the copolymers containing carboxyl groups, by a slight cross-linking, for example with epoxides or isocyanates. The sandwich metal sheets can be processed in a manner corresponding, within wide limits, to that of usual metal sheets, i.e., they may be creased, bent, shaped, welded and riveted. Unless their curvature radii are too narrow, they may even be formed with plug and ring. There are obtained sandwich metal sheets having such a damping effect and such a temperature range of damping as are well sufficient for most fields of application.

Small amounts of fillers, for example, for improving the electric conductivity (improvement of the resistance welding) may be added to the vibration damping material. For not adversely affecting the damping effect, it is advantageous to add less than 1 percent by weight, preferably less than 0.5 percent by weight calculated on the polymer, of the filler amount. Appropriate fillers are, for example, heavy spar, silicic acid, graphite and soot.

The total thickness of the sandwich system of the invention preferably ranges between 1 and 6 millimeters. The interlayers may be in the range of from 0.1 to 1 millimeter, preferably from 0.2 to 0.5 millimeter. The maximum damping effect is obtained in symmetrical sandwich systems. The stiffness in flexure and the stability, however, are higher in asymmetric sandwich arrangements having the same weight. These asymmetric sandwich systems are therefore preferred for uses which require the highest possible stability, calculated on the weight. The ratio between the thicknesses of, for example, metal sheets, preferably ranges between 1:1 and 1:4.

What is claimed is:

1. In a vibration damped sandwich system including hard plates and a vibration damping interlayer, an interlayer having improved damping effect within a broad temperature range, comprising: a copolymer of 75–50 percent by weight vinyl acetate, 5 to 15 percent by weight ethylene, and 20 to 35 percent by weight ethyl acrylate.

2. An improved vibration damping interlayer as recited in claim 1, wherein the copolymer contains up to 1 percent by weight, calculated on the copolymer, of a filler selected from the group consisting of heavy spar, silicic acid, graphite and soot.

3. A vibration damping sandwich system as recited in claim 1 comprising outer plates having a thickness ratio to one another of from 1:1 to 1:4.

* * * * *